3,046,294
PRIMARY AMINE CATALYZED PROCESS FOR PRODUCING HYDROXYSILICON COMPOUNDS
Roscoe A. Pike, Grand Island, N.Y., assignor to Union Carbide Corporation, a corporation of New York
No Drawing. Filed Dec. 31, 1959, Ser. No. 863,106
12 Claims. (Cl. 260—448.2)

This invention relates to a process for producing organosilicon compounds.

Hydroxyl end-blocked diorganosiloxanes that are represented by the formula:

(1)

wherein R is an unsubstituted or substituted monovalent hydrocarbon group and $a$ has a value of at least 2, have been found to be useful in producing silicone oils which are employed as hydraulic fluids and silicone gums which are employed in producing elastomers. However the processes suggested to date for producing hydroxyl end-blocked diorganosiloxanes have not been entirely satisfactory.

One known process for producing hydroxyl end-blocked diorganosiloxanes involves reacting a completely condensed diorganopolysiloxane and steam. However this known process suffers from the disadvantage that pressures as high as 1000 pounds per square inch and temperatures as high as 400° C. are required. Such temperatures can cause undesirable side reactions and the need to maintain such temperatures in the reaction zone lessens the commercial attractiveness of the process.

Another known process for producing hydroxyl end-blocked diorganosiloxanes involves reacting a completely condensed diorganopolysiloxane and water in the presence of a nitrile solvent and a basic catalyst (e.g. a quaternary ammonium or alkali metal hydroxide or silanolate). The desirability of this known process is limited since nitriles are toxic substances and so constitute a hazard for operating personnel.

It is an object of this invention to provide a process for producing hydroxyl end-blocked diorganosiloxanes which is operable at moderate temperatures and which does not require the use of toxic nitriles.

This invention provides a process for producing hydroxyl end-blocked diorganosiloxanes containing at least two diorganosiloxy groups which involves reacting a completely condensed diorganopolysiloxane and water in the presence of at least one mole of an aliphatic primary amine catalyst per mole of water at a temperature up to 150° C.

The aliphatic primary amines that are suitable for use in this invention are aliphatic compounds containing one, two, three or more primary amino groups (i.e. —NH$_2$ groups). These aliphatic amines can contain other substituents in addition to primary amino groups (e.g. they can also contain secondary amino, tertiary amino, hydroxyl or alkoxy groups). The preferred aliphatic primary amines contain at least two primary amino groups and from 2 to 10 carbon atoms inclusive per molecule.

Illustrative of aliphatic amines that are suitable for use in this invention are propyl amine, butyl amine, amyl amine, ethylene diamine, propylene diamine, butylene diamine, diethylene triamine

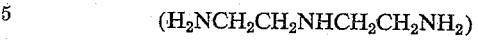

3-methoxypropyl amine, aminoethylethanolamine

ethanol amine, 3-[bis-2 - hydroxyethyl] - aminopropyl amine [(HOCH$_2$CH$_2$)$_2$NCH$_2$CH$_2$CH$_2$NH$_2$] and the like.

At least one mole of an aliphatic primary amine per mole of water is employed in this invention. A greater amount of the amine can be employed. However, lesser amounts of the amine are not useful since little or none of the desired hydroxyl end-blocked diorganosiloxanes are produced when lesser amounts are employed. Preferably from 2 moles to 7 moles of the aliphatic primary amine per mole of water are employed.

The diorganopolysiloxanes employed in this invention as starting materials are composed predominantly of groups represented by the formula:

(2)

wherein R has the above-defined meaning. These compounds are completely condensed. That is, they are essentially free of silicon-bonded hydroxyl groups (i.e. they contain less than one silicon-bonded hydroxyl group per 250 silicon atoms).

Illustrative of the unsubstituted monovalent hydrocarbon groups represented by R in Formulae 1 and 2 are the alkyl groups (e.g. the methyl, ethyl and octadecyl groups), the cycloalkyl groups (e.g. the cyclohexyl and the cyclopentyl groups), the aryl groups (e.g. the phenyl, tolyl, xenyl and naphthyl groups), the aralkyl groups (e.g. the benzyl and beta-phenylethyl groups), the alkenyl groups (e.g. the vinyl, allyl and hexenyl groups), and the cycloalkenyl groups (e.g. the cyclohexenyl groups). Illustrative of the substituted monovalent hydrocarbon groups represented by R in Formulae 1 and 2 are the alkyl, cycloalkyl, aryl, aralkyl, alkenyl and cycloalkenyl groups containing as substituents one or more amino, cyano, hydroxyl, alkoxy, or aryloxy groups. When the diorganopolysiloxane contains cyano groups as substituents on the substituted hydrocarbon group some hydrolysis of the cyano groups to form —COOH groups can occur during the process of this invention. The groups represented by R in Formulae 1 and 2 preferably contain from 1 to 10 carbon atoms inclusive.

The diorganopolysiloxanes represented by Formula 2 include linear polymers containing alkoxy groups (e.g. methoxy, ethoxy or propoxy) or trihydrocarbonsiloxy groups (e.g. trimethylsiloxy groups) as end-blocking or chain terminating groups. These diorganopolysiloxanes also include cyclic polymers such as diorganosiloxane cyclic trimers, tetramers and pentamers. Owing to the presence of small amounts of monofunctional siloxane groups (e.g. trimethylsiloxy groups) or trifunctional siloxane groups (e.g. methylsiloxy groups), these diorganopolysiloxanes can contain an organic group to silicon atom ratio from 1.8:1 to 2.1. Preferably the organic group to silicon atom ratio is from 1.95 to 2.05.

One class of diorganopolysiloxanes that are useful in this invention as starting materials are end-blocked linear diorganopolysiloxane oils which are represented by the formulae:

$$R'O(\underset{\underset{Me}{|}}{\overset{\overset{Me}{|}}{Si}}O)_b R' \qquad (3)$$

$$R'O(\underset{\underset{Me}{|}}{\overset{\overset{Me}{|}}{Si}}O)_c(\underset{\underset{(CH_2)_eNH_2}{|}}{\overset{\overset{Me}{|}}{Si}}O)_d R' \qquad (4)$$

$$R'O(\underset{\underset{Me}{|}}{\overset{\overset{Me}{|}}{Si}}O)_c(\underset{\underset{Me}{|}}{\overset{\overset{Vi}{|}}{Si}}O)_d R' \qquad (5)$$

wherein R' is an alkyl group, preferably an ethyl group, or a trimethylsilyl group, $b$ has a value of at least seven and preferably has a value from 200 to 4000, $c$ and $d$ each have a value of at least one, the sum of $c$ and $d$ has a value of at least seven and preferably has a value from 200 to 4000, and $e$ has a value of at least 3 and preferably has a value from 3 to 5. As used herein the symbol "Me" denotes the methyl group and the symbol "Vi" denotes the vinyl group.

A second class of diorganopolysiloxanes that are useful in this invention as starting materials are dimethylpolysiloxane gums which are represented by the formula:

$$(-\underset{\underset{Me}{|}}{\overset{\overset{Me}{|}}{Si}}O-)_f \qquad (6)$$

wherein $f$ has a value from 6000 to 15000.

A third class of diorganopolysiloxanes that are useful in this invention as starting materials are cyclic diorganosiloxanes which are represented by the formulae:

$$(\underset{\underset{Me}{|}}{\overset{\overset{Me}{|}}{Si}}O)_g \qquad (7)$$

$$(\underset{\underset{(CH_2)_eNH_2}{|}}{\overset{\overset{Me}{|}}{Si}}O)_g \qquad (8)$$

wherein $g$ has a value from 3 to 7 inclusive and preferably 3 or 4 and $e$ has a value of at least 3 and preferably has a value from 3 to 5 inclusive.

The disorganopolysiloxanes used in this invention as starting materials are known compounds and can be produced from available materials by known processes. By way of illustration, suitable diorganopolysiloxanes can be produced from diorganodialkoxysilanes by hydrolysis and known condensation procedures or from other diorganosiloxanes by known equilibration procedures.

In the process of this invention the starting diorganopolysiloxane and water react according to the skeletal equation:

$$-\underset{|}{\overset{|}{Si}}-O-\underset{|}{\overset{|}{Si}}-+H_2O \xrightarrow[\text{catalyst}]{\text{amine}} 2 -\underset{|}{\overset{|}{Si}}OH \qquad (9)$$

Amounts of water from 0.25 to 5 times the stoichiometric amounts required to react with the diorganopolysiloxane according to Equation 9 are useful but amounts of water from 1 to 2 times the stoichiometric amount required to react with the diorganopolysiloxane are preferred.

The aliphatic primary amines employed in the process of this invention catalyze the reaction represented by Equation 9 and this catalytic effect is surprising in view of the fact that equivalent results are not obtained when other basic compounds are employed in lieu of these amines. By way of illustration, it is known that quaternary ammonium hydroxide or potassium hydroxide must be employed together with toxic nitriles in order to catalyze the reaction represented by Equation 9. As a further illustration, potassium hydroxide, in the absence of a nitrile, catalyzes condensation reactions which are the reverse of the reaction represented by Equation 9.

A particularly significant advantage of the process of this invention is that it can be conducted at atmospheric pressure. Known processes for producing hydroxyl end-blocked diorganosiloxane by reacting a completely condensed diorganopolysiloxane and steam require pressures as high as 1000 pounds per square inch and higher. Although it is preferred to conduct the process of this invention at about atmospheric, pressures above atmospheric can be employed, if desired.

Temperatures up to 150° C. are employed in the process of this invention. Temperatures below 75° C. can be employed but are not particularly desirable because of the slower reaction rate at these temperatures. Temperatures from 100° C. to 125° C. are preferred. At temperatures up to 150° C. the operating difficulties (e.g. corrosion of the reaction vessel and side reactions) encountered in higher temperature processes (e.g. those that require temperatures up to 400° C.) are considerably reduced. The process can be conducted for from 0.5 to 12 hours but preferably is conducted for from 3 to 6 hours.

Any alkoxy groups in the starting diorganopolysiloxane may be converted to alcohols or may remain attached to silicon. These alcohols and alkoxysilicon compounds can be separated from the desired diorganosiloxanes by any suitable means (e.g. by fractional distillation at reduced pressure). Any trihydrocarbonsiloxy or hydrocarbonsiloxy groups in the starting diorganopolysiloxane are present at the completion of the process in compounds (e.g. hexahydrocarbon disiloxanes or hydrocarbonpolysiloxanes) which can be separated from the desired diorganosiloxanes by any suitable means (e.g. by fractional distillation at reduced pressure).

The hydroxyl end-blocked diorganopolysiloxanes produced in accordance with this invention are compounds represented by the formula:

$$HO(\underset{\underset{R}{|}}{\overset{\overset{R}{|}}{Si}}O)_h H \qquad (10)$$

wherein R is an unsubstituted or a substituted monovalent hydrocarbon group as defined above for Formula 1 and $h$ has a value from 2 to 250 inclusive or higher.

Among the classes of hydroxyl end-blocked diorganosiloxanes produced in accordance with this invention are those represented by the formulae:

$$HO(\underset{\underset{Me}{|}}{\overset{\overset{Me}{|}}{Si}}O)_h H \qquad (11)$$

$$HO(\underset{\underset{(CH_2)_eNH_2}{|}}{\overset{\overset{Me}{|}}{Si}}O)_h H \qquad (12)$$

$$HO(\underset{\underset{Me}{|}}{\overset{\overset{Vi}{|}}{Si}}O)_h H \qquad (13)$$

$$HO(\underset{\underset{Me}{|}}{\overset{\overset{Me}{|}}{Si}}O)_j(\underset{\underset{(CH_2)_eNH_2}{|}}{\overset{\overset{Me}{|}}{Si}}O)_k H \qquad (14)$$

$$HO(\underset{\underset{Me}{|}}{\overset{\overset{Me}{|}}{Si}}O)_j(\underset{\underset{Me}{|}}{\overset{\overset{Vi}{|}}{Si}}O)_k H \qquad (15)$$

wherein $j$ and $k$ each have a value of at least one, wherein $h$ and $e$ have the above-defined meanings and the sum of $j$ and $k$ has a value from 2 to 250 inclusive. These diorganosiloxanes are produced by employing as starting materials these of the above-described completely condensed diorganopolysiloxanes that contain the same organo groups as these diorganosiloxanes.

In general, the lower values of $h$ in Formula 10 can be obtained: (1) by conducting the process of this invention at temperatures at or near 150° C. rather than at lower temperatures; (2) by conducting the process at the lower amine to water ratio within the above-mentioned range; (3) by conducting the process at the higher water to diorganopolysiloxane ratios within the above-mentioned ranges; (4) by conducting the process for the shorter times within the above-mentioned ranges, and (5) by rapidly cooling reaction mixture to room temperature at the completion of the process. One or more of these means can be used to control the particular type of product desired.

The production of the process of this invention are usually mixtures of hydroxyl end-blocked diorganosiloxanes. These mixtures can be represented by Formula 11 wherein $h$ has an averaged value.

The compounds represented by Formula 11 can be designated as hydroxyl end-blocked diorganosiloxanes or, alternately, as diorganosiloxane diols.

Another significant advantage of the process of this invention is that it can be conducted in the absence of a solvent. Hence an undesirable feature of one known process for producing hydroxyl end-blocked diorganosiloxanes (e.g. the use of toxic nitriles as solvents) can be avoided. However, if desired, suitable non-toxic solvents can be employed (e.g. 1,2-dimethoxy ethylene, $MeOCH_2CH_2OMe$).

At the completion of the process of this invention the amine catalyst, any unreacted siloxane starting material, any solvent and any excess water can be separated from hydroxyl-end-blocked diorganosiloxane by any conventional means (e.g. the amine and any excess water can be separated by heating the reaction mixture at subatmospheric pressure to volatilize the amine and water).

The hydroxyl end-blocked diorganosiloxanes produced in accordance with the process of this invention are useful per se as hydraulic fluids. These siloxanes can also be converted by known procedures to silicone gums and, ultimately, to silicone elastomers.

The following examples illustrate the present invention:

Example I

A mixture was formed in a 250 milliliter flask fitted with a reflux condenser. The mixture contained 29.6 grams (0.1 mole) of $(Me_2SiO)_4$, 1.8 grams (0.1 mole) of water and 74.0 grams (1.0 mole) of propylene diamine. The mixture was heated at reflux (118° C.–120° C.) at atmospheric pressure for about five hours. The mixture was continuously stirred. The mixture was then slowly cooled to room temperature. Water (100 milliliters) was added, a siloxane-containing layer separated from the mixture and this layer was dissolved in ether. The ether solution so obtained was washed with three 50 milliliter portions of water. The final wash water was found to be neutral to litmus paper after the washing. The ether solution was then dried over anhydrous $Na_2SO_4$ and the dried solution was heated at 50° C. at 1 mm. of Hg. A clear, colorless fluid (25.1 grams) was obtained which had a refractive index ($n_D^{25}$) of 1.4036, a viscosity of 31.6 centistokes at 20° C. and a hydroxyl content of 3.2 wt.-percent. This fluid had the average formula: $HO(MeSiO)_{14.2}H$.

Example II

Thirteen experiments were performed employing the general procedure described in Example I. The following diorganopolysiloxane starting materials were employed.

Experiments 1 to 9 _____ $(MeSiO)_4$.
Experiments 10 and 11 ___ A mixture of 75 wt.-percent $(Me_2SiO)_4$ and 25 wt.-percent $(MeViSiO)_4$.
Experiment 12 _____ A mixture of 48 wt.-percent $(Me_2SiO)_4$ and 52 wt.-percent $[NC(CH_2)_3SiMeO]_4$.
Experiment 13 _____ A mixture of 90 wt.-percent $(Me_2SiO)_4$ and 10 wt.-percent $[(C_6H_5)_2SiO]_4$.

The conditions and results are tabulated below.

| Experiment | Amine | Mole Ratio, Amine: Water: Starting Siloxane | Time at Reflux (hours) [1] | OH Content of Product (wt.-percent) | Percent Conversion [2] |
|---|---|---|---|---|---|
| 1 | propylene diamine | 5:1:1 | 5 | 2.8 | 78.4 |
| 2 | ----do---- | 5:1:1 | 1.75 | 3.7 | 40.5 |
| 3 | ----do---- | 10:1:1 | 5 | 3.2 | 85.0 |
| 4 | 3-methoxy-propylamine | 2.5:2:1 | 12 | 4.2 | 32 |
| 5 | diethylenetriamine | 5:1:1 | 2.5 | 1.7 | 83 |
| 6 | ----do---- | 5:1:1 | 1 | 2.0 | 37 |
| 7 | ethylenediamine | 10:1:1 | 5 | 3.0 | 64 |
| 8 | aminoethylethanolamine | 2:1:1 | 5 | 3.0 | 24 |
| 9 | 3-[bis-2-hydroxyethyl]-amino propylamine | 2:1:1 | 5 | 3.0 | 42 |
| 10 | propylenediamine | 6:1:.65 | 5 | 0.6 | 91 |
| 11 | ----do---- | 6:1:.65 | 6 | 1.2 | 90 |
| 12 | ----do---- | 5:1:3 | 5 | 1.6 | 84 |
| 13 | ----do---- | 5:1:3 | 5 | 1.1 | 67 |

[1] Reflux temperatures were about 115–120° C.
[2] The percent conversion was computed by the formula:

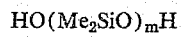

$$\text{Percent conversion} = \frac{\text{wt. of product} \times 100}{\text{wt. of starting siloxane}}$$

In experiments 1 to 9 the products were compounds that had the formula:

$$HO(Me_2SiO)_mH$$

wherein $m$ had the following values.

| Experiment | $m$ |
|---|---|
| 1 | 16.2 |
| 2 | 12.2 |
| 3 | 14.2 |
| 4 | 10.8 |
| 5 | 26.8 |
| 6 | 22.8 |
| 7 | 15.2 |
| 8 | 15.2 |
| 9 | 15.2 |

In experiments 10 and 11 the products were diorganosiloxanes containing hydroxy end-blocking groups and dimethylsiloxy and/or methylvinylsiloxy groups.

In experiment 12 the product was a mixture of diorganosiloxanes containing hydroxyl end-blocking groups and dimethylsiloxy and/or gamma-cyanopropyl methylsiloxy groups.

In experiment 13 the product was a mixture of diorganosiloxanes containing hydroxyl end-blocking groups and dimethylsiloxy and/or diphenylsiloxy groups.

Example III

Following the general procedure described in Example I, four experiments were performed under the conditions tabulated below employing $(Me_2SiO)_4$ as the starting diorganopolysiloxane and propylene diamine as the catalyst.

| Experiment | Mole Ratio, Amine: Water: Starting Siloxane | Time at Reflux (hr.) | OH Content of Product (wt.-Percent) | Percent Conversion |
|---|---|---|---|---|
| 1 | 2.5:1:1 | 5.5 | 3.0 | 67 |
| 2 | 1.2:1:1 | 5 | 2.5 | 42 |
| 3 | 0.9:1:1 | 5 | | 0 |
| 4 | 0.083:1:1 | 5 | | 0 |

The results of these experiments demonstrate that when less than one mole of the amine per mole of water is used the desired hydroxyl end-blocked diorganopolysiloxanes are not produced.

*Example IV*

In accordance with the process of this invention, the indicated products can be produced from the indicated starting siloxanes:

| Starting Siloxanes | Products |
|---|---|
| Me<br>\|<br>(SiO)$_g$<br>\|<br>(CH$_2$)$_m$CN<br><br>wherein $g$ has a value of 3 or 4 and $m$ has a value of at least 2 | Me<br>\|<br>HO(SiO)$_h$H<br>\|<br>(CH$_2$)$_m$CN<br><br>wherein $h$ has a value from 5 to 250 inclusive |
| Vi<br>\|<br>(SiO)$_g$<br>\|<br>Me<br><br>wherein $g$ has a value of 3 to 5 | Vi<br>\|<br>HO(SiO)$_h$H<br>\|<br>Me<br><br>wherein $b$ has a value from 5 to 250 inclusive |
| (R$_2$SiO)$_g$<br><br>wherein $g$ has a value from 3 to 7 and R has the meaning defined for Formula 1 | siloxanes represented by Formula 10 |
| Completely condensed linear siloxanes containing at least seven groups represented by the formula:<br><br>R<br>\|<br>(—SiO—)<br>\|<br>R<br><br>wherein R has the meaning defined for Formula 1 | siloxanes represented by Formula 10 |

What is claimed is:

1. A process for producing diorganosiloxanes represented by the formula:

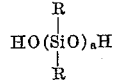

wherein R is a member selected from the group consisting of the unsubstituted monovalent hydrocarbon groups and the substituted monovalent hydrocarbon groups containing at least one substituent selected from the group consisting of the amino, cyano, hydroxyl, alkoxy and aryloxy groups and $a$ has a value of at least 2, which process comprises reacting (1) a cyclic diorganopolysiloxane having the formula:

$$(R_2SiO)_g$$

wherein R has the above-defined meaning and $g$ has a value from 3 to 7 inclusive and (2) water in the presence of at least one mole of an aliphatic primary amine per mole of water at a temperature from 75° C. to 150° C., said process being conducted in the absence of any nitrile solvent.

2. The process of claim 1 wherein each R is a methyl group.

3. A process for producing diorganosiloxanes represented by the formula:

wherein R is a member selected from the group consisting of the unsubstituted monovalent hydrocarbon groups and the substituted monovalent hydrocarbon groups containing at least one substituent selected from the group consisting of the amino, cyano, hydroxyl, alkoxy and aryloxy groups and $a$ has a value of at least 2, which process comprises reacting (1) a completely condensed linear diorganopolysiloxane containing at least seven groups represented by the formula:

—SiO—
(with R above and below)

wherein R has the above-defined meaning and (2) water in the presence of at least one mole of an aliphatic primary amine per mole of water at a temperature from 75° C. to 150° C., said process being conducted in the absence of any nitrile solvent.

4. A process of claim 3 wherein each R is a methyl group.

5. A process for producing diorganosiloxanes represented by the formula:

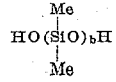

wherein $b$ has a value from 2 to 250 inclusive which process comprises reacting (1) a cyclic diorganopolysiloxane represented by the formula:

wherein $g$ has a value from 3 to 5 inclusive and (2) water, said water being present in an amount from 1 to 2 times the stoichiometric amount required to react with the cyclic diorganopolysiloxane, in the presence of at least one mole of an aliphatic primary amine, said amine containing at least two primary amino groups and from 2 to 10 carbon atoms, per mole of water, at a temperature from 100° C. to 125° C. and at about atmospheric pressure, said process being conducted in the absence of any nitrile solvent.

6. The process of claim 5 wherein the amine is propylene diamine.

7. A process for producing diorganosiloxanes represented by the formula:

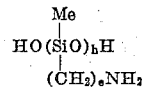

wherein $h$ has a value from 2 to 250 inclusive and $e$ has a value of at least 3 which process comprises reacting (1) a cyclic diorganopolysiloxane represented by the formula:

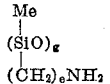

wherein $g$ has a value from 3 to 5 and $e$ has a value of at least three and (2) water, said water being present in an amount from 1 to 2 times the stoichiometric amount required to react with the cyclic diorganopolysiloxane, in the presence of at least one mole of an aliphatic primary amine, said amine containing at least two primary amino groups and from 2 to 10 carbon atoms, per mole of water at a temperature from 125° C. to 150° C. and at about atmospheric pressure, said process being conducted in the absence of any nitrile solvent.

8. The process of claim 7 wherein the aliphatic primary amine is propylene diamine.

9. A process for producing diorganosiloxanes represented by the formula:

$$HO(\underset{(CH_2)_mCN}{\underset{|}{\overset{Me}{\overset{|}{Si}}O}})_bH$$

wherein $b$ has a value from 2 to 250 inclusive and $m$ has a value of at least 2 which process comprises reacting (1) a cyclic diorganopolysiloxane represented by the formula:

$$(\underset{(CH_2)_mCN}{\underset{|}{\overset{Me}{\overset{|}{Si}}O}})_g$$

wherein $g$ has a value from 3 to 5 and $m$ has a value of at least 2 and (2) water, said water being present in an amount from 1 to 2 times the stoichiometric amount required to react with the cyclic diorganopolysiloxane, in the presence of at least one mole of an aliphatic primary amine, said amine containing at least two primary amino groups and from 2 to 10 carbon atoms, per mole of water at a temperature from 125° C. to 150° C. and at about atmospheric pressure, said process being conducted in the absence of any nitrile solvent.

10. The process of claim 9 wherein the amine is ethylene diamine.

11. A process for producing diorganosiloxanes represented by the formula:

$$HO(\underset{Me}{\underset{|}{\overset{Vi}{\overset{|}{Si}}O}})_hH$$

wherein $h$ has a value from 2 to 250 inclusive which process comprises reacting (1) a cyclic diorganopolysiloxane represented by the formula:

$$(\underset{Me}{\underset{|}{\overset{Vi}{\overset{|}{Si}}O}})_gH$$

wherein $g$ has a value from 3 to 5 and (2) water, said water being present in an amount from 1 to 2 times the stoichiometric amount required to react with the cyclic diorganopolysiloxane, in the presence of at least one mole of an aliphatic primary amine, said amine containing at least two primary amino groups and from 2 to 10 carbon atoms, per mole of water at a temperature from 125° C. to 150° C. and at about atmospheric pressure, said process being conducted in the absence of any nitrile solvent.

12. The process of claim 11 wherein the amine is ethylene diamine.

References Cited in the file of this patent
UNITED STATES PATENTS

| | | |
|---|---|---|
| 2,600,307 | Lucas et al. | June 10, 1952 |
| 2,843,555 | Berridge | July 15, 1958 |
| 2,863,897 | Wehrly | Dec. 9, 1958 |
| 2,907,782 | Pike | Oct. 6, 1959 |